United States Patent
Arato et al.

(10) Patent No.: US 6,224,646 B1
(45) Date of Patent: May 1, 2001

(54) WASTE TREATMENT SYSTEM

(75) Inventors: Claudio Arato, Vancouver; Martin Hildebrand, Mitchell, both of (CA)

(73) Assignee: Manitoba Ltd., Winnipeg (*) Notice: Subject to any disclaimer, the term of this patent is extended or adjusted under 35 U.S.C. 154(b) by 0 days.

(21) Appl. No.: 09/032,405

(22) Filed: Feb. 27, 1998

Related U.S. Application Data

(60) Provisional application No. 60/093,053, filed on Oct. 17, 1997.

(51) Int. Cl.[7] ............................... C05F 11/08; C02F 3/30
(52) U.S. Cl. ............................ 71/9; 71/10; 71/11; 71/15; 210/612; 435/268
(58) Field of Search ............................ 71/9, 15, 11, 10, 71/21; 210/609, 610, 613; 426/55, 56, 59, 807, 635, 41, 262; 435/268

(56) References Cited

U.S. PATENT DOCUMENTS

| | | | |
|---|---|---|---|
| 3,846,559 | * | 11/1974 | Stevens .................................. 426/2 |
| 3,847,803 | * | 11/1974 | Fisk ........................................ 210/8 |
| 3,955,536 | * | 5/1976 | Bunger ................................... 119/28 |
| 3,973,043 | * | 8/1976 | Lynn ...................................... 426/55 |
| 4,018,899 | * | 4/1977 | Seckler et al. ........................ 426/55 |
| 4,022,665 | | 5/1977 | Sambhunath . |
| 4,213,587 | * | 7/1980 | Ishida et al. ........................... 210/6 |
| 4,213,857 | | 7/1980 | Ryoichi . |
| 4,246,099 | | 1/1981 | Michael . |
| 4,424,129 | * | 1/1984 | Bunger ................................ 210/388 |
| 4,511,370 | | 4/1985 | Hunziker ........................... 48/197 A |
| 4,632,692 | * | 12/1986 | Lebesgue et al. ..................... 71/10 |
| 4,750,457 | * | 6/1988 | Santina et al. ......................... 123/3 |
| 4,769,149 | * | 9/1988 | Nobilet et al. ....................... 210/603 |
| 5,118,336 | * | 6/1992 | Biez ........................................ 71/6 |
| 5,500,306 | * | 3/1996 | Hsu et al. ............................. 429/17 |
| 5,531,898 | * | 7/1996 | Wickham ............................ 210/606 |
| 5,587,081 | | 12/1996 | Norcross et al. . |
| 5,716,523 | * | 2/1998 | Powlen ................................ 210/611 |
| 5,741,346 | * | 4/1998 | Glover .................................. 71/15 |
| 5,803,022 | * | 9/1998 | Nelson et al. ......................... 123/25 |
| 5,810,903 | * | 9/1998 | Branconnier et al. .................... 71/9 |

FOREIGN PATENT DOCUMENTS

1166812 * 7/1985 (CH) ............................. B01J/2/04

OTHER PUBLICATIONS

Barnard, James et al., "Optimizing ammonia removal in sequencing batch reactors", Water Environment Federation, p629–640,1997.*

Bortone, G. et al., "Experimental study of biological nitrogen and phosphorus removal in an anaerobic/anoxic sequencing batch reactor", Ingegneria Ambientale, p207–215, 1995.*

* cited by examiner

*Primary Examiner*—Wayne Langel
(74) *Attorney, Agent, or Firm*—M. R. Williams; A. D. Battison; R. W. Dupuis

(57) ABSTRACT

A waste treatment system is herein described. A microbial additive containing a mixture of enzymes and bacteria designed to produce anoxic degradation of the waste is added to the waste composed of liquid waste containing solid content and the waste is shredded and mixed, thereby resulting in waste having a more homogeneous texture. The waste is then heated while shredding and mixing continues. The heating process eliminates pathogens. The result is that a combination of anoxic and anaerobic microbial activity within the waste is promoted while the organic portion of the solid content is largely dissolved into liquids, gases and biomass. Following heating, shredding and mixing, the treated waste separates into waste liquid and waste solid as the unsolubilized solids precipitate out of solution. Using a combination of augmenting specially formulated populations of bacteria and enzymes, shredding and mixing, anaerobic and anoxic conditions, elevated temperatures, solid liquid separation, and gas collection, the above described waste treatment system achieves the following objectives: reduce waste odour; solubilize organic waste solids into liquids, gases and biomass; reduce waste strength; stabilize waste; eliminate pathogens; separate remaining solids from liquids; remove and clean odorous gases generated by the reactions; maintain the nitrogen, phosphorus, potassium in the ratios and quantities necessary to promote the treated waste as a valuable fertilizer.

7 Claims, 1 Drawing Sheet

WASTE TREATMENT SYSTEM

This application is derived from Provisional Patent Application Serial No. 60/093,053 filed on Dec. 17, 1997.

The present invention relates to a method of treating waste.

BACKGROUND OF THE INVENTION

According to municipalities, government agencies, environmentalists and the public in general, odour and potential pollution sources emanating from swine facilities are the main issues that the hog industry needs to address in order to sustain its development. The most intense source of odour from livestock facilities occurs during manure handling and land application. The manure from hogs can generally be classified as low volume, high strength liquid waste. That is, waste of high strength requires high levels of oxygen to biodegrade and may contaminate ground water. Typically, most commercial hog operations feature under-floor manure storage pits. These pits are situated beneath the barns and store the manure until the manure is emptied from the pit and transferred to mid-term storage lagoons. The odour problem that arises when the manure is stored in such a manner is a result of the anaerobic conditions that exist in the lagoon. Typically, aerobic conditions exist only in the layer of manure that is in contact with air and the malodorous gases produced anaerobically beneath this layer gradually diffuse to the surface, which in turn raises the prospect of public annoyance and creates health concerns for the swine herd and the barn workers. Conditions where anaerobic processes under very low dissolved oxygen (<0.5 mg/l) conditions occur are referred to as anoxic conditions. Current methods used in controlling odour production during manure handling and land application have only been capable of suppressing or delaying odour production. Without an adequate treatment, producers are forced to handle manure that is highly non-homogeneous, which can cause a variety of technical and mechanical related problems. Therefore, a method of waste treatment must ensure odour reduction or elimination as well as a reduction in solids content or volume and waste strength. Waste strength is directly related to the Biological Oxygen Demand (BOD) of the waste. The BOD defines the waste strength in that it depicts the amount of oxygen required by the waste in order to biodegrade. Such a method will reduce handling concerns and pollution such as ground water contamination and/or air pollution caused by the malodorous gases. Furthermore, the treated waste produced should be a low strength waste and have high nutrient content (nitrogen, phosphorus, potassium) which is essential for fertilizer value.

It is of note that nutrient application to farm land must be balanced with the ability of the crops to utilize the nutrients applied. That is, excess nutrients in the fertilizer that are not absorbed by the soil are likely to contaminate the aquifers and surface water bodies. As a result, the amount of fertilizer that can be applied to a given plot of land is highly dependent upon the local soil conditions, hydrology, geology and geography. However, in many cases, it is not cost effective for swine producers to haul raw manure long distances if the land surrounding the facility is already nutrient rich. Clearly, in cases such as these, it would be preferable to be able to separate the nutrients from the manure, thereby producing a concentrated fertilizer. As a result, the condensed fertilizer could be cost effectively transported and applied to farm land significant distances away from the swine production facility.

SUMMARY OF THE INVENTION

It is an object of the invention, therefore, to provide a system for treating waste.

According to one aspect of the invention there is provided a method of treating waste liquid containing solid content comprising:

providing waste liquid containing solid content;

heating the waste to a temperature range of 40–70° C. for a time period of 12–36 hours, thereby reducing waste strength and odour of the waste; and separating the treated waste into liquid material and solid material. Heating will eliminate many pathogens within the waste.

Preferably, the waste is mixed and shredded during heating.

Preferably, the method includes treating the waste with augmenting bacteria and enzymes prior to heating. The addition of bacteria and enzymes promotes anoxic/anaerobic breakdown of the waste in the manure pit.

Preferably, the method includes removing gases emitted during heating of the waste and bubbling the gases back into the liquid material and the solid material. As a result of this arrangement, the nutrient content of the liquid material and the solid material is enhanced.

The liquid and/or solid material may be used as fertilizer and/or disposed of as a benign waste.

Preferably, the waste strength and the odour of the waste are reduced in the absence of added chemicals.

Preferably, the nutrient content (nitrogen, phosphorus, potassium) of the waste is maintained.

The waste may be homogenized prior to and/or during heating.

The method may include heating the waste at a pH range of 8.5 to 9.5, thereby promoting production of gases. Furthermore, the heating may be done at lower than ambient pressure, which will promote liberation of gases, such as ammonia gas, nitrogen gas, methane and carbon dioxide, from the waste. The gases may then be cooled and condensed to liquid form, thereby producing liquid fertilizer.

According to a second aspect of the invention, there is provided a waste treatment system for treating waste liquid containing solid content comprising:

a reactor tank for reducing waste strength and odour of the waste, thereby producing treated waste, said reactor tank comprising:
    a reactor inlet arranged to accept the waste;
    heating means for heating the waste in the reactor tank;
    a reactor tank homogenizing system for mixing the waste;
    a shredding system to reduce particle size; and
    a withdraw port for removing the treated waste from the reactor tank.

The waste treatment system may include a clarifier for separating the treated waste into liquid material and solid material, said clarifier comprising:
    a clarifier inlet arranged to accept the treated waste from the withdraw port;
    a liquid outlet for removing the liquid material from the clarifier; and
    a solid outlet for removing the solid material from the clarifier.

The waste treatment system may include a flow equalization tank for storing and mixing of the waste, said flow equalization tank comprising;
    a flow equalization tank homogenizing system for mixing the waste; and
    a siphon port for supplying the waste to the reactor inlet;

Preferably, the heating means may be comprised of a heat exchange system within the reactor tank.

The waste treatment system may include de-watering means connected to the solid waste outlet for removing residual liquid from the solid material.

Preferably, the waste treatment system includes gas collection means for removing gases emitted from the waste in the reactor tank.

The waste treatment system may include gas injection means for bubbling the gases removed by the gas collection means into the liquid and solid material.

The storage inlet may comprise a cone-shaped flow distribution baffle.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
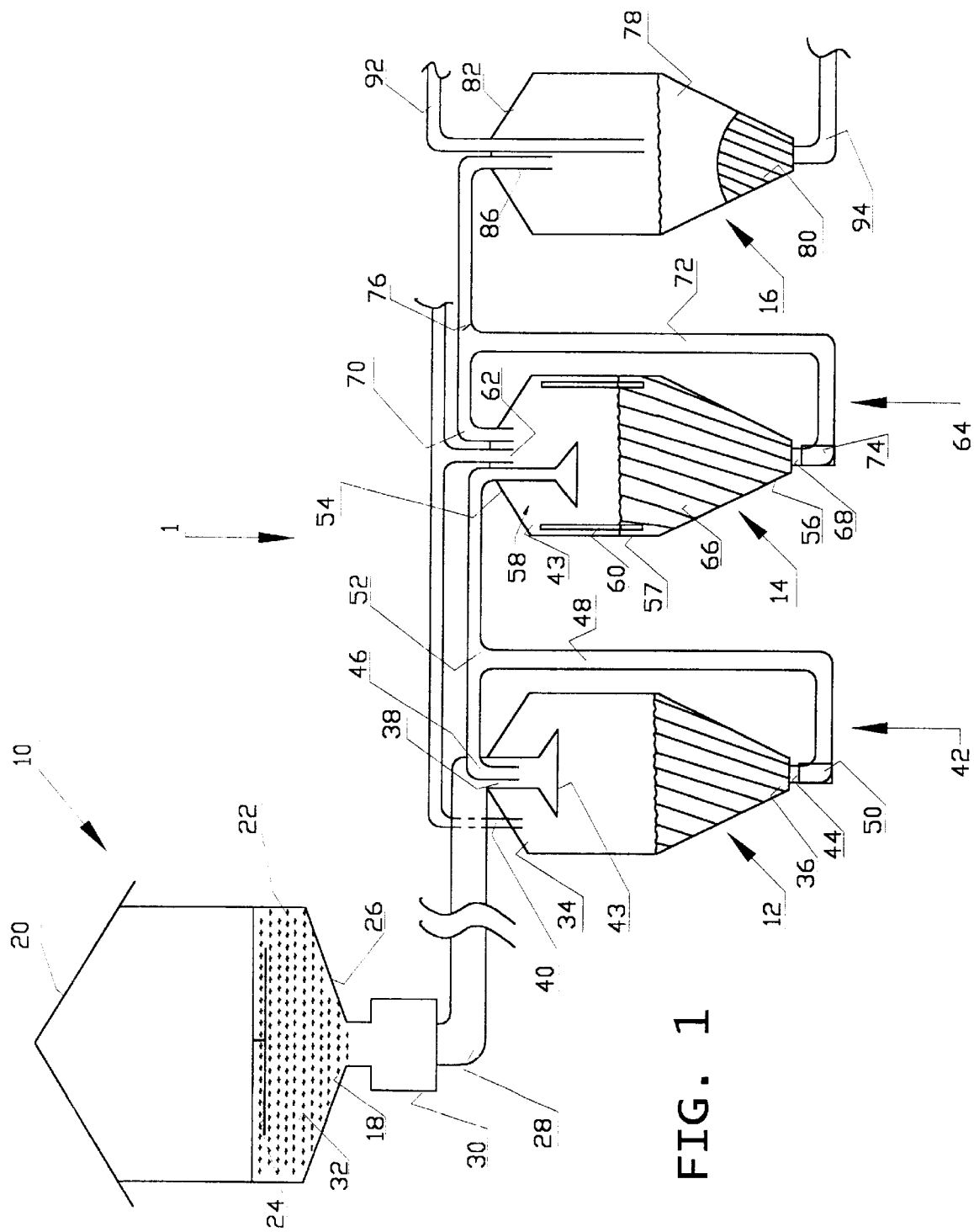
FIG. 1 is side view in cross section of the waste treatment system.

Referring to the drawings, a waste treatment system 1 comprises a waste source 10, a flow equalization tank 12, a reactor tank 14 and a clarifier tank 16.

The waste source 10 provides waste 18 composed of waste liquid containing solid content for treatment by the waste treatment system 1. Specifically, the waste strength and the odour of the waste 18 are reduced by the waste treatment system 1 as described below. In this embodiment, the waste source 10 comprises a barn 20 for holding livestock therein. The barn 20 includes a manure pit 22 beneath the barn 20 for collecting the waste 18 from the livestock as described below. The manure pit 22 includes a surface sprayer 24, a waste outlet 26, a waste duct 28 and a pump 30. The surface sprayer 24 is arranged to distribute a microbial additive 32 comprising a mixture of enzyme and bacteria throughout the manure pit 22 for promoting solubilization and odour reduction of the waste 18. The waste outlet 26 is connected to the waste duct 28 which is in turn connected to the pump 30. As a result of this arrangement, the pump 30 draws the waste 18 from the manure pit 22 out of the manure pit 22 through the waste outlet 26 and along the waste duct 28, as described below.

The flow equalization tank 12 is arranged for mixing the waste 18 therein, thereby further homogenizing the texture of the waste 18. The flow equalization tank 12 comprises a top 34, a base 36, a waste intake 38, a storage gas port 40 and a storage homogenizing system 42. The waste intake 38 is arranged to accept the waste 18 from the waste source 10. In this embodiment, the waste intake 38 comprises a baffle 43 located proximal to the top 34 of the flow equalization tank 12. The baffle 43 is arranged to be of variable height relative to the top 34 of the flow equalization tank 12. It is of note that the baffle 43 is arranged to distribute the waste 18 from the waste source 10 into the flow equalization tank 12 so as to promote mixing of the waste 18 therein. In this embodiment, the baffle 43 has a substantially cone-like shape and the waste 18 is applied directly onto the baffle 43. As a result, the waste 18 is distributed as a thin film over the baffle 43, thereby allowing for maximum waste surface area exposure. The storage gas port 40 is arranged to remove gases emitted by the anoxic and anaerobic bacteria during breakdown of the waste 18 from the flow equalization tank 12 as described below. The storage homogenizing system 42 is arranged to mix the waste 18 in the flow equalization tank 12. Speclfically, in this embodiment, the storage homogenizing system 42 comprises a withdraw port 44 located at the base 36 of the flow equalization tank 12, a return port 46 located at the top 34 of the flow equalization tank 12, a duct 48 interconnecting the withdraw port 44 and the return port 46 and a chopper pump 50 coupled to the duct 48. Thus, the chopper pump 50 draws the waste 18 out of the withdraw port 44 at the base 36 of the flow equalization tank 12 and shreds the waste 18 before returning the waste 18 to the flow equalization tank 12, thereby recirculating, mixing and homogenizing the waste 18.

In this embodiment, the storage homogenizing system 42 further includes a siphon port 52 arranged to remove a portion of the waste 18 from the duct 48 and transport the portion of the waste 18 to the reactor tank 14 as described below.

The reactor tank 14 is arranged for treating the waste 18, thereby reducing waste strength and the odour of the waste 18. The reactor tank 14 comprises a top 54, a base 56, walls 57, a reactor inlet 58, a heat exchange system 60, a reactor gas port 62 and a reactor homogenizing system 64.

In this embodiment, the reactor inlet 58 comprises a baffle 43 that is arranged to distribute the waste 18 from the flow equalization tank 12 into the reactor tank 14 so as to promote mixing of the waste 18 therein as described above. The heat exchange system 60 is arranged to heat the waste 18, thereby reducing waste strength and odour of the waste as well as eliminating pathogens and producing treated waste 66 as described below. The reactor gas port 62 is arranged to remove gases emitted from the treated waste 66 during heating as described below. The reactor homogenizing system 64 is arranged to mix the treated waste 66. In this embodiment, the reactor homogenizing system 64 comprises a withdraw port 68 located at the base 56 of the reactor tank 14, a return port 70 located at the top 54 of the reactor tank 14, a duct 72 interconnecting the withdraw port 68 and the return port 70 and a chopper pump 74 coupled to the duct 72. Thus, the chopper pump 74 draws the treated waste 66 from the base 56 of the reactor tank 14 and shreds the treated waste 66 before returning the treated waste 66 to the reactor tank, thereby recirculating, mixing and homogenizing the treated waste 66. Specifically, the combination of heating and shredding of the waste 18 eliminates pathogens and stabilizes the waste such that no further breakdown of the waste occurs and no gases are released, as described below. In essence, the waste is stabilized following treatment.

In this embodiment, the reactor homogenizing system 64 further includes a removal port 76 arranged to remove a portion of the treated waste 66 from the duct 72 and transport the portion of the treated waste 66 to the clarifier tank 16 as described below.

The clarifier tank 16 is arranged for accepting the treated waste 66 and separating the treated waste 66 into waste liquid 78 and waste solid 80. The clarifier tank 16 comprises a top 82, a base 84, a waste liquid outlet 92 and a waste solid outlet 94. The clarifier inlet 86 is arranged to accept the treated waste 66 from the reactor tank 14 as described below. The waste liquid outlet 92 is located at the top 82 of the clarifier tank 16 and is arranged for removing the waste liquid 78 from the top 82 of the clarifier tank 16 as described below. The waste solid outlet 94 is located at the base 84 of the clarifier tank 16 and is arranged for removing waste solid 80 from the clarifier tank 16 as described below.

The waste treatment system 1 is assembled as follows. The waste duct 28 is connected to the waste intake 38, the siphon port 52 is connected to the reactor inlet 58 and the removal port 76 is connected to the clarifier inlet 86.

In operation, waste 18 is produced by the livestock in the barn 20 and the waste 18 drops from the barn 20 to the manure pit 22. At this point, the waste 18 is of highly heterogeneous texture. Specifically, the waste 18 is composed of a mixture of faeces, urine, feed, water, hooves, hair and after-birth. The waste 18 is approximately 50–75% biodegradable, consisting of carbohydrates, proteins and fats, which is an ideal medium for microbial growth. As noted above, the surface sprayer 24 distributes the microbial additive 32 onto the waste 18 at regular intervals. Specifically, the microbial additive 32 is composed of a mixture of enzymes and microbes which will stimulate activity within the waste 18. In one embodiment, the microbial additive comprises a combination of enzymes and micro-organisms. The bacterial augmentation in the manure pit promotes more anoxicdanaerobic processes than aerobic processes. While aerobic conditions exist in the upper film of the waste in the manure pit due to surface contact with the atmosphere, this aerobic zone is almost insignificant in relation to the majority of the waste in the manure pit which is in an anaerobic condition. Specifically, the aerobic zone is small due to crust build-up on the waste. By using bacterial augmentation in the manure pit, solids are channelled through the bacteria and solubilized in the process. The formulated bacteria are essentially designed to assist the naturally-occurring bacterial populations in swine waste to solubilize the waste more rapidly and efficiently. In speeding up the solubilization process, the crusting is reduced and the odours released by anaerobic breakdown of the waste are reduced. At intervals, the waste 18 is drawn through the waste outlet 26 and into the waste duct 28 by the pump 30. The waste 18 is then deposited into the flow equalization tank 12 via the waste intake 38. Therein, the waste 18 is recirculated through the flow equalization tank 12 by the storage homogenizing system 42. As a result of this arrangement, the waste 18 is mixed and anoxic conditions exist. During this process, gases, for example carbon dioxide, methane, ammonia, nitrogen gas and the like are produced by the anaerobic and aerobic bacteria. As noted above, these gases are removed from the flow equalization tank 12 via the storage gas port 40. At regular intervals, a portion of the waste 18 is removed from the storage homogenizing system 42 through the siphon port 52 and the portion of the waste 18 is transferred to the reactor tank 14 through the reactor inlet 58. Therein, the waste 18 is heated by the heat exchanger system 60 to a temperature within the range of 40–70° C. for a period of 12–36 hours, thereby producing treated waste 66. In this embodiment, the waste 18 is heated to approximately 60° C. for approximately 24 hours. Furthermore, the treated waste 66 in the reactor tank 14 is recycled by the reactor homogenizing system 64 and the gases emitted from the treated waste 66 in the reactor tank 14 are removed via the reactor gas port 62. It is of note that the heating of the waste 18 combined with the shredding of the waste 18 eliminates pathogens and promotes breakdown of the waste 18, that is, conversion of the solid content of the waste 18 into colloid and solute fractions. Specifically, the combination of heating and shredding stabilizes the treated waste 66 such that no gases are emitted and the treated waste 66 is stabilized. It is of note that treatment of the waste 18 occurs in the absence of added oxygen. Furthermore, tests indicate that this process is most efficient at the natural pH, which is anticipated to obviate regular chemical additions to modify the pH of the waste 18. The end result is that the waste 18 is broken down to biomass material, carbon dioxide, nitrate and water and undissolved solids precipitate readily out of solution as a result of the heating and shredding. At regular intervals, a quantity of the treated waste 66 is removed from the reactor homogenizing system 64 through the removal port 76 and transferred to the clarifier tank 16 via the clarifier inlet 86. Therein, the treated waste 66 separates into waste liquid 78 and waste solid 80. Furthermore, the removal of the emitted gases also greatly reduces odours associated with treatment of the waste 18 by the waste treatment system 1. Periodically, the waste liquid 78 is removed via the waste liquid outlet 92 at the top 82 of the clarifier tank 16. It is of note that the waste liquid 78 may be used, for example, as liquid fertilizer. Similarly, periodically, the waste solid 80 is removed via the waste solid outlet 94 and dried. It is of note that the waste solid 80 may be pelletized and used, for example, as a dry fertilizer or as a feed supplement.

The end result of treatment of the waste 18 by the waste treatment system 1 is that a substantial majority of the biodegradable portion of the waste 18 is solubilized. Furthermore, odours produced from the waste 18 are limited by the waste treatment system 1 through the action of the reactor gas port 62 and the storage gas port 40, which remove the malodorous gases produced by the anaerobic bacteria from the reactor tank 14 and the flow equalization tank 12 respectively.

It is of note that, in this embodiment, the waste treatment system 1 is arranged to be a continuous flow system, wherein waste is removed from each of the tanks simultaneously. Alternatively, the waste treatment system 1 could also be run in batch mode. Furthermore, no additional oxygen is added to the waste treatment system.

In other embodiments, the waste solid outlet 94 may be connected to a de-watering unit. The de-watering unit is arranged so that the waste solid 80 is deposited onto the de-watering unit by the waste solid outlet 94 which forces residual liquid out of the waste solid 80, thereby drying the waste solid 80 as described below. Following de-watering, the waste solid 80 may be dried and pelletized and used, for example, as a dry fertilizer or as a feed supplement.

In another embodiment, the gases removed via the storage gas port 40 and the reactor gas port 62 may be bubbled into the waste liquid 78 and the waste solid 80 via gas injection means, thereby enriching the nutrient content of the waste liquid 78 and the waste solid 80 by recycling nitrogen.

In yet another embodiment, the liquid waste 78 may be stored in an outdoor storage tank and the outdoor storage tank may include gas injection means for bubbling gases removed via the storage gas port 40 and the reactor gas port 62 into the liquid waste 78, thereby conserving nutrient content, as discussed above. Alternatively, the gas could be deaned and have odours removed by using a gas scrubber or filtration system.

In an alternative embodiment, the reactor tank 14 includes a vacuum for generating a lower pressure zone in the reactor tank 14. As the pH range of the treated waste 66 in the reactor tank 14 is approximately 8.5 to 9.5 and, as noted above, the waste 18 is distributed as a thin film, production of ammonia gas within the reactor tank 14 is maximized. Specifically, the factors that determine the effectiveness of stripping ammonia out of water are pH, relative pressure, temperature and film thickness. In the above-described arrangement, these factors are maximized for the liberation of ammonia gas from the treated waste 66. In addition, other gases, for example, methane, carbon dioxide and water vapour will be liberated from the treated waste 66 as well. In operation, the gases are forced to move towards the lower pressure zone at the upper portion of the reactor tank 14. The gases are then drawn out of the reactor tank 14 through the reactor gas port 62. Once removed from the reactor tank 14, the gases are transferred to a condensor tank wherein the gases are cooled and condensed back into liquid form. The resulting product is therefore a highly condensed nutrient rich liquid fertilizer. Furthermore, the treated waste 66 remaining in the reactor tank 14 is processed as described above, thereby producing waste liquid 78 and waste solid 80 having a low nutrient content. As a result, the waste liquid 78 and the waste solid 80 may be applied in large volumes without fear of groundwater and surface contamination. Furthermore, the condensed nutrient rich liquid fertilizer can be cost effectively transported and applied to farm land significant distances from the swine production site.

An alternative waste source may be human waste or any other high strength waste.

Since various modifications can be made in the invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A method of treating hog waste comprising:

collecting hog waste containing suspended or dissolved solid content in a manure pit, said hog waste comprising manure, urine, feed, water, hooves and hair;

promoting solubilization and odor reduction of the hog waste in the manure pit by distributing a mixture of enzymes and bacteria throughout the hog waste;

pumping the hog waste containing suspended or dissolved solid content from the manure pit to a homogenization tank;

homogenizing and mixing the hog waste under anoxic conditions by
        removing waste from a bottom of the homogenization tank,
        operating a chopper pump to shred the removed waste; and
        distributing the removed waste into the hog waste by returning the removed waste to the homogenization tank at a position above a top level of the hog waste in the homogenization tank; and
        removing gases emitted from the hog waste during homogenization from the homogenization tank;

pumping the homogenized waste from the homogenization tank into a reaction tank;

reducing strength of the homogenized waste and odors from the homogenized waste and solubilizing and breaking down the homogenized waste into biomass material, $CO_2$, nitrate and water by
        heating the waste to a temperature range of 40–70° C. under anoxic conditions;
        incubating the waste at a temperature range of 40–70° C. under anoxic conditions for a time period of 12–36 hours; and
        circulating the homogenized waste while incubating the homogenized waste by
            operating a pump to remove homogenized waste from a bottom of the reaction tank; and
            distributing the removed waste into the hog waste by returning the removed waste to the reaction tank at a position above a top level of the homogenized waste in the reaction tank;

pumping the treated waste from the reaction tank into a clarifier tank; and allowing the treated waste to separate into liquid material and solid material.

2. The method according to claim 1 wherein the homogenized waste is incubated at a temperature of about 60° C.

3. The method according to claim 1 including removing gases emitted during heating of the homogenized waste.

4. The method according to claim 1 wherein the pump in the reactor tank is a chopper pump.

5. The method according to claim 1 wherein the manure pit is beneath the hog barn.

6. The method according to claim 1 including enriching nutrient content of the liquid material by bubbling the emitted gases into the liquid material.

7. A method of treating hog waste comprising:

collecting hog waste containing suspended or dissolved solid content in a manure pit, said hog waste comprising manure, urine, feed, water, hooves and hair;

promoting solubilization and odor reduction of the hog waste in the manure pit by distributing a mixture of enzymes and bacteria throughout the hog waste;

pumping the hog waste containing suspended or dissolved solid content from the manure pit to a homogenization tank;

homogenizing and mixing the hog waste under anoxic conditions by
        removing waste from a bottom of the homogenization tank,
        operating a chopper pump to shred the removed waste; and
        distributing the removed waste onto the surface of the waste in the homogenization tank by depositing the removed waste onto a baffle located at a position above a top level of the hog waste in the homogenization tank; and
        removing gases emitted from the hog waste during homogenization from the homogenization tank;

pumping the homogenized waste from the homogenization tank into a reaction tank;

reducing strength of the homogenized waste and odors from the homogenized waste and solubilizing and breaking down the homogenized waste into biomass material, $CO_2$, nitrate and water by
        heating the waste to a temperature of about 60° C. under anoxic conditions;
        incubating the waste at a temperature of about 60° C. under anoxic conditions for a time period of 12–36 hours; and
        circulating the homogenized waste while incubating the homogenized waste by
            operating a pump to remove homogenized waste from a bottom of the reaction tank; and
            distributing the removed waste onto the surface of the waste in the reaction tank by depositing the removed onto a baffle located at a position above a top level of the homogenized waste in the reaction tank:

pumping the treated waste from the reaction tank into a clarifier tank; and allowing the treated waste to separate into liquid material and solid material.

* * * * *

UNITED STATES PATENT AND TRADEMARK OFFICE
CERTIFICATE OF CORRECTION

PATENT NO. : 6,224,646 B1
DATED : May 1, 2001
INVENTOR(S) : Claudio Arato; Martin Hildebrand It is certified that error appears in the above-identified patent and that said Letters Patent is hereby corrected as shown below:

<u>Title page,</u>
Item [54], Assignee should read "3721290 Manitoba Ltd."

Signed and Sealed this

Nineteenth Day of March, 2002

Attest:

Attesting Officer

JAMES E. ROGAN
Director of the United States Patent and Trademark Office